(12) United States Patent
Lu

(10) Patent No.: US 7,990,729 B2
(45) Date of Patent: Aug. 2, 2011

(54) BATTERY HOLDER

(75) Inventor: Pen-Uei Lu, Tu-Cheng (TW)

(73) Assignee: Chi Mei Communcation Systems, Inc., Tu-Cheng, New Taipei (TW)

(*) Notice: Subject to any disclaimer, the term of this patent is extended or adjusted under 35 U.S.C. 154(b) by 114 days.

(21) Appl. No.: 12/477,219

(22) Filed: Jun. 3, 2009

(65) Prior Publication Data

US 2010/0149760 A1 Jun. 17, 2010

(30) Foreign Application Priority Data

Dec. 15, 2008 (CN) .......................... 2008 1 0306249

(51) Int. Cl.
*H05K 7/00* (2006.01)

(52) U.S. Cl. .................... 361/747; 361/801; 361/803

(58) Field of Classification Search .................. 361/747, 361/800–803, 679.01, 679.02, 679.58, 600; 292/194; 439/136, 142, 153, 152, 157, 159, 439/160

See application file for complete search history.

(56) References Cited

U.S. PATENT DOCUMENTS

| | | | | |
|---|---|---|---|---|
| 6,583,600 B2 * | 6/2003 | Haga et al. | ..................... | 320/110 |
| 6,807,067 B2 * | 10/2004 | Zhou | ............................. | 361/814 |
| 6,869,299 B2 * | 3/2005 | Tanaka et al. | ................. | 439/188 |
| 7,220,152 B2 * | 5/2007 | Jeong | ............................ | 439/862 |
| 7,824,792 B2 * | 11/2010 | Shi | .................................. | 429/96 |

* cited by examiner

*Primary Examiner* — Hung S Bui

(74) *Attorney, Agent, or Firm* — Steven M. Reiss

(57) ABSTRACT

A battery holder in an electronic device includes a battery receptacle, a locking member, and at least one resilient member. The battery is received in the battery receptacle. The locking member partially protrudes into the battery receptacle and locks the battery. The at least one resilient member and the electronic device are integrally formed. The battery includes a base wall, beyond which the at least one resilient member elastically extends into the battery receptacle.

17 Claims, 5 Drawing Sheets

BATTERY HOLDER

BACKGROUND

1. Technical Field

The present disclosure generally relates to battery holders, particularly, to a battery holder used in a portable electronic device.

2. Description of Related Art

Portable electronic devices such as mobile phones and personal digital assistants (PDAs) are widely used. Changeable batteries are installed in many to supply electric power. When a battery is installed in a portable electronic device, it is generally sealed and fixed in place by a battery holder, thus the battery and the inner circuits of the portable electronic device are well protected.

A typical battery holder has a battery receiving bay, a resilient member, and a locking member. The battery receiving bay includes a base wall. A mounting portion is defined in the base wall. The resilient member is received in the mounting portion, and partially protrudes into the battery receiving bay. The battery is held in the battery receiving bay by the locking member. When the battery is held in the battery receiving bay, the resilient member is compressed. When the locking member releases the battery, an resilient force created by the resilient member ejects the battery out of the battery receiving bay.

However, the mounting portion includes a crossbeam and a locking protrusion fixing and situating the resilient member partially into the battery. Therefore, the mounting portion is complex, and complicated to machine.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
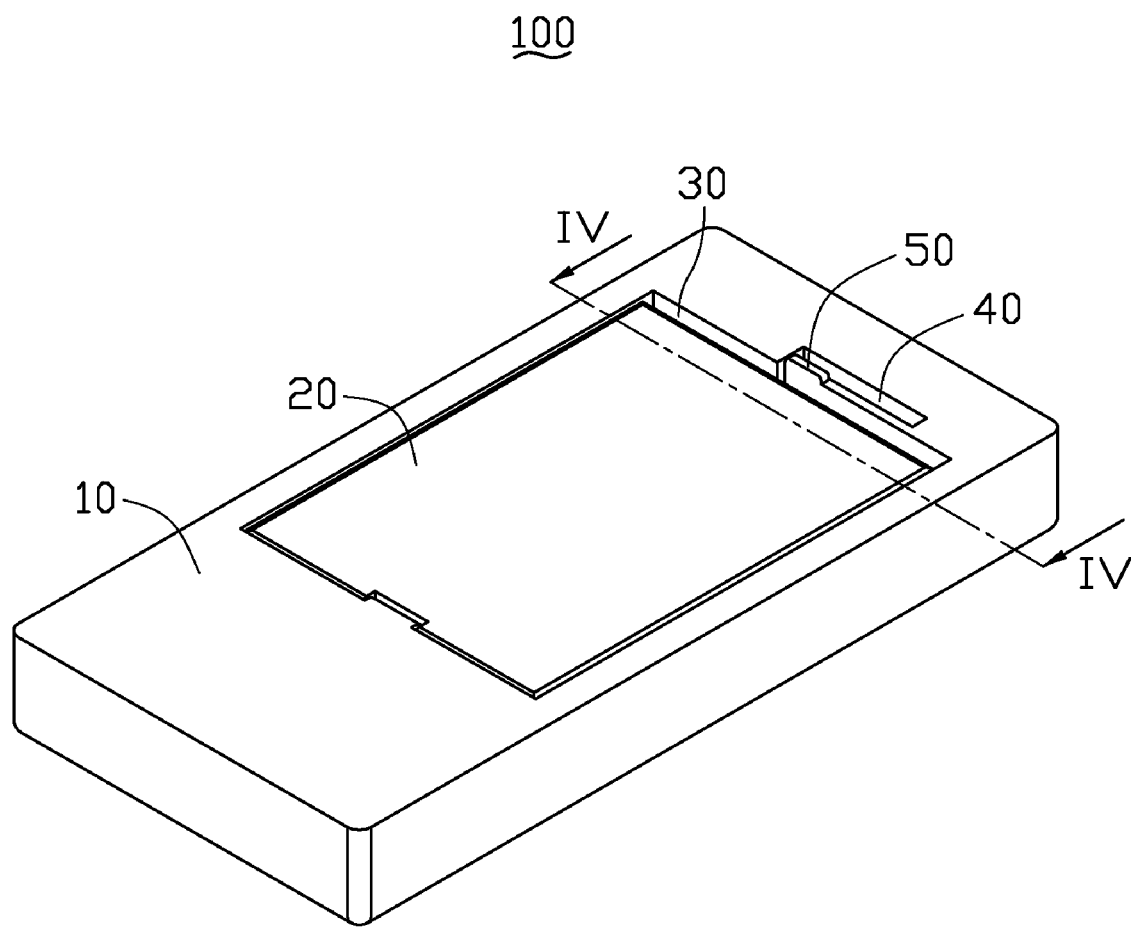
FIG. 1 is an assembled, isometric view of an embodiment of a battery holder, deployed in a portable electronic device.

The present battery holder may be used in portable electronic devices, such as mobile phones, personal digital assistants, and others. Referring to FIG. 1, an exemplary embodiment of the portable electronic device 100 is described and illustrated as a mobile phone.

Figure 2:
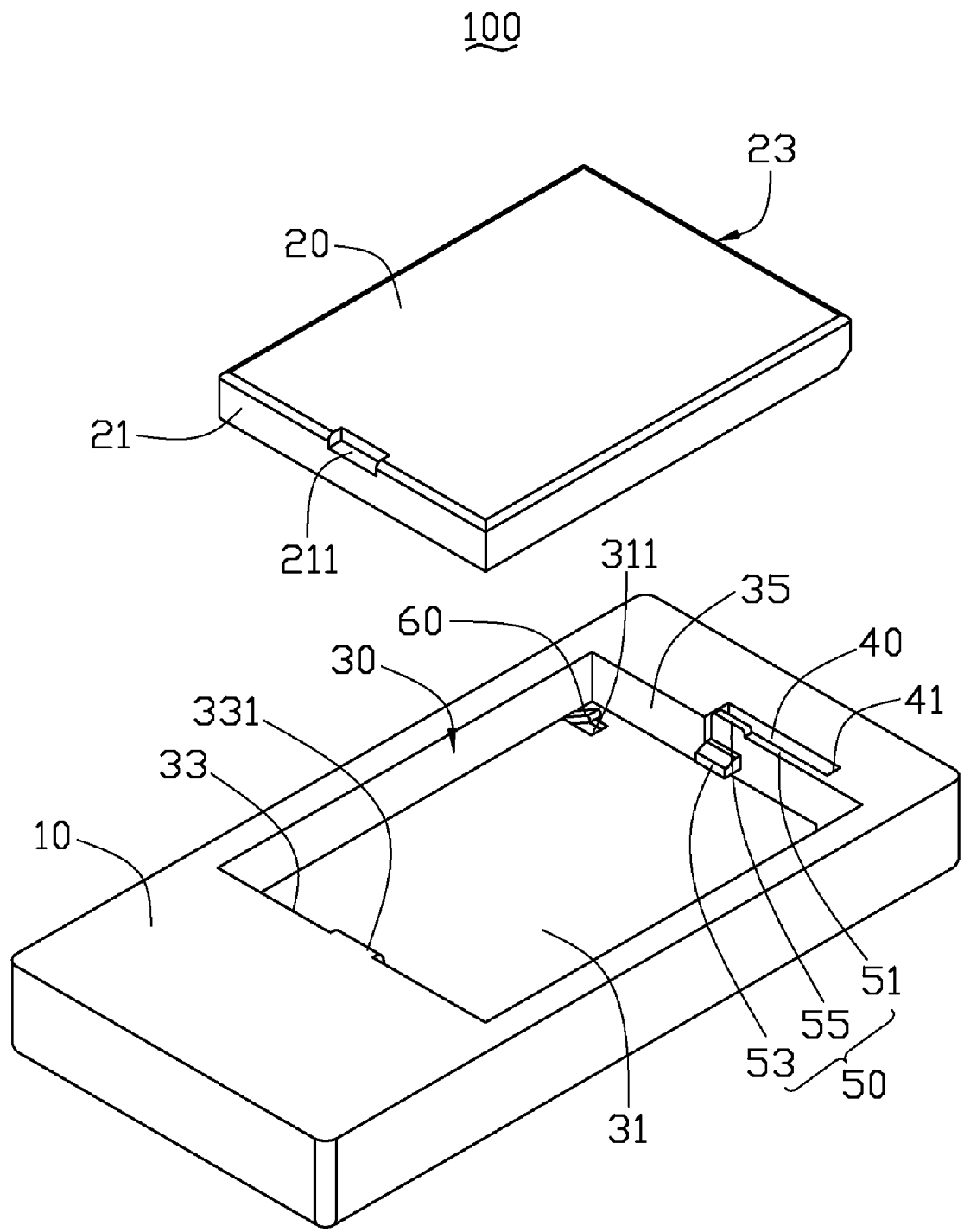
FIG. 2 is an exploded, isometric view of the portable electronic device of FIG. 1.

Referring to FIG. 1 and FIG. 2, the portable electronic device 100 includes a body 10, a battery 20, a battery receptacle 30, a receiving chamber 40, a locking member 50, and at least one resilient member 60. The battery receptacle 30 and the receiving chamber 40 are defined in the body 10. The battery 20 is received in the battery receptacle 30. The locking member 50 is received in the receiving chamber 40, and part of the locking member 50 protrudes into the battery receptacle 30. The at least one resilient member 60 and the body 10 are integrally formed.

Figure 3:
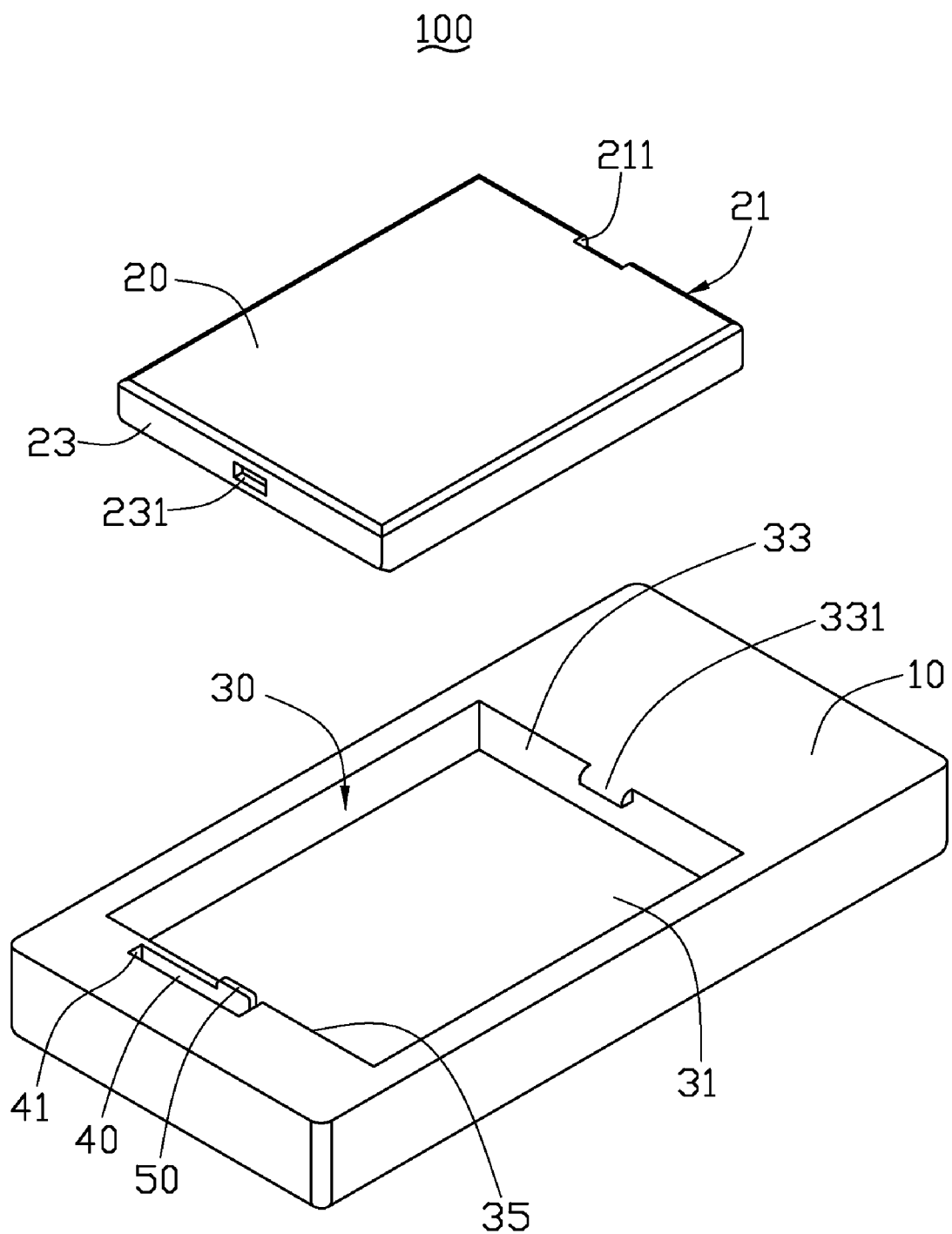
FIG. 3 is an exploded, isometric view of the portable electronic device of FIG. 1 viewed from another aspect.

Referring to FIG. 2 and FIG. 3, the battery 20 includes a first surface 21 and a second surface 23 opposite to the first surface 21. A first locking slot 211 is defined in the first surface 21 of the battery 20. A second locking slot 231 is defined in the second surface 23 of the battery 20.

The battery receptacle 30 includes a base wall 31, a first sidewall 33 and a second sidewall 35 on another side of the battery receptacle 30 opposite to the first sidewall 33. The first sidewall 33 and the second sidewall 35 are perpendicular to the base wall 31. Two rectangular mounting slots 311 are defined in opposite corners of the base wall 31. A locking portion 331 protrudes from the first sidewall 33 into the battery receptacle 30, and the locking portion 331 engages the first locking slot 211 of the battery 20.

The receiving chamber 40 includes a connecting wall 41 and communicates with the battery receptacle 30.

Referring to FIG. 2, the locking member 50 includes a main body 51, a resisting portion 53, and a switch portion 55. The main body 51 perpendicularly protrudes from the connecting wall 41 of the receiving chamber 40. The main body 51 is a resilient arm, and can elastically swing relative to the connecting wall 41. The resisting portion 53 protrudes from the main body 51 to the first sidewall 33 of the battery receptacle 30. The switch portion 55 protrudes from the main body 51 to the outside of the receiving chamber 40.

Figure 4:
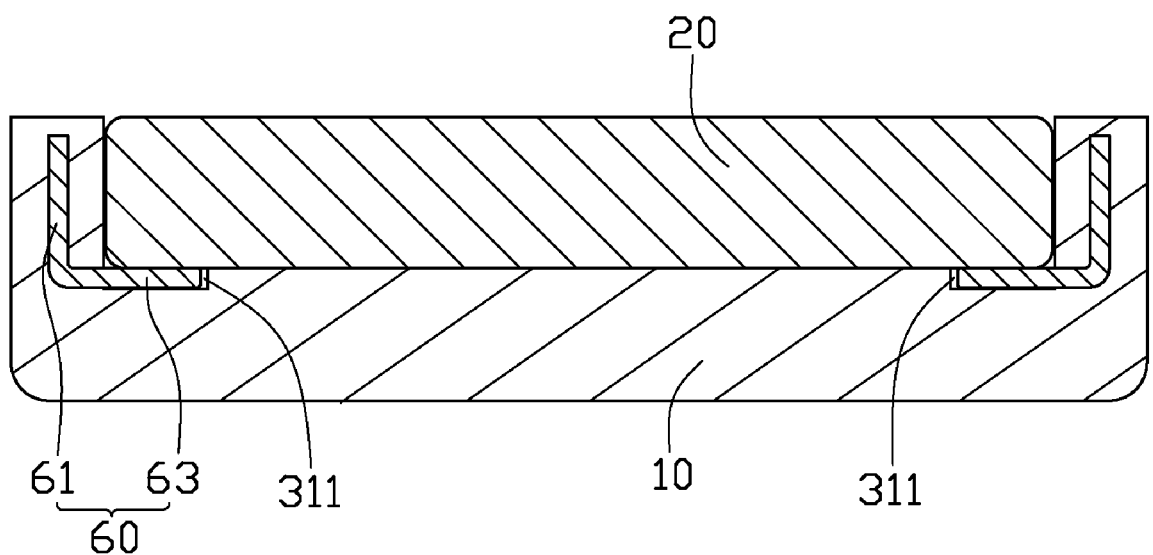
FIG. 4 is a cross-section of the portable electronic device of FIG. 1 taken along line IV-IV.
Figure 5:
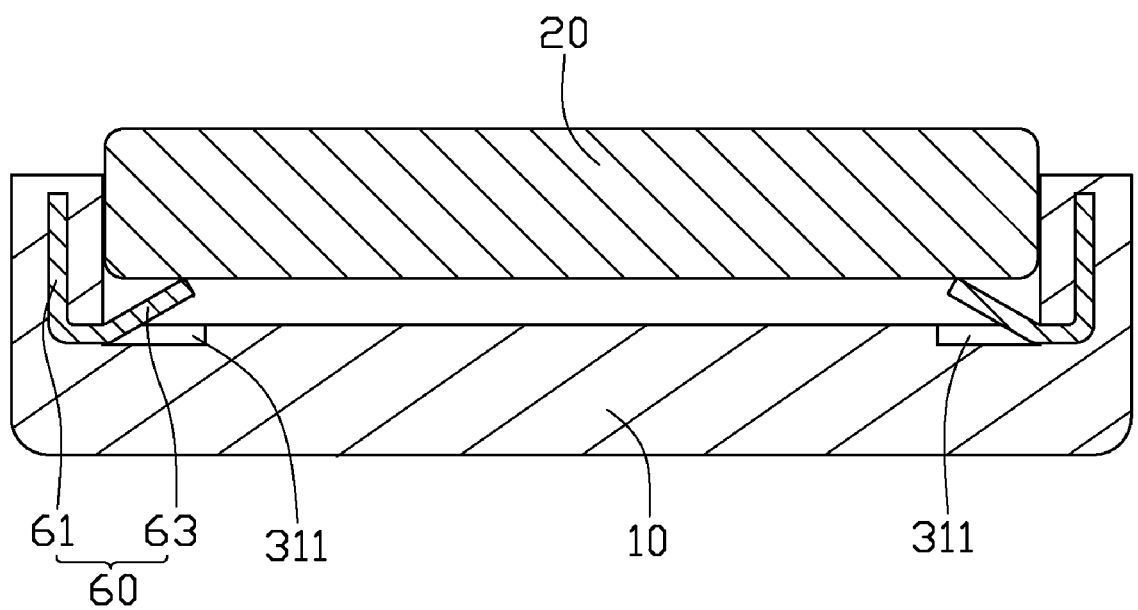
FIG. 5 is a cross-section of the portable electronic device of FIG. 1 showing the battery elevated by the resilient member.

Referring to FIG. 2, FIG. 4, and FIG. 5, the at least one resilient member 60 includes a fixing portion 61 and a warped portion 63 protruding from one end of the fixing portion 61. The warped portion 63 can swing relative to the fixing portion 61 elastically. The resilient member 60 is formed integrally with the body 10 by insert-molding. The fixing portion 61 is enclosed in the body 10, the warped portion 63 protrudes from the body 10 via the mounting slot 311 of base wall 31 and into the battery receptacle 30. In the illustrated embodiment, two resilient members 60 are received in the two mounting slots 311 correspondingly, and the two resilient members 60 are elastic strips.

Referring to FIG. 2 and FIG. 4, when installing the battery 20 into the battery receptacle 30, the first surface 21 of the battery 20 contacts the first sidewall 33 of the battery receptacle 30, and the locking portion 331 of the first sidewall 33 engages the first locking slot 211 of the battery 20. When switch portion 55 of the locking member 50 is actuated, the main body 51 swings towards the receiving chamber 40. When the battery 20 is completely received in the battery receptacle 30, the switch portion 55 is released, and the locking member 50 returns to its initial location by resilient force. The battery 20 compresses the warped portion 63 of the resilient member 60, which is completely received in the mounting slot 311 as a result. The resisting portion 53 engages the second locking slot 231 of the battery 20, so that the battery 20 is locked in the battery receptacle 30.

Referring to FIG. 2 and FIG. 5, to remove the battery 20 from the battery receptacle 30, when the switch portion 55 of the locking member 50 is actuated, the resisting portion 53 exits from the second locking slot 231. Resilient forces created by the warped portions 63 elevate the battery 20, which can then be removed from the battery receptacle 30.

In the embodiment of the portable electronic device 100, the resilient member 63 and the body 10 are integrally formed, and no other fixing device is needed to fix the resilient member 60. Therefore, the battery holder has a simplified and easily manufactured structure.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A battery holder of an electronic device, comprising:
a battery receptacle comprising a base wall, a first sidewall and a second sidewall, the first and the second sidewalls extending substantially perpendicularly from the base wall, a locking portion formed on the first sidewall, the second sidewall positioned opposite to the first sidewall;
a receiving chamber communicating with the battery receptacle through the second sidewall;
a locking member capable of partially protruding in the battery receptacle or moving out of the battery receptacle; and
at least one resilient member integrally formed with the electronic device, at least part of the at least one resilient member elastically protruding from the base wall into the battery receptacle.

2. The battery holder of claim 1, wherein the receiving chamber comprises a connecting wall; and the locking member comprises a main body protruding therefrom.

3. The battery holder of claim 2, wherein the locking member further comprises a resisting portion protruding from the main body and extending into the battery receptacle.

4. The battery holder of claim 1, wherein the at least one resilient member comprises a fixing portion and a warped portion protruding from one end of the fixing portion; the fixing portion received in the body and the warped portion extending from the base wall into the battery receptacle.

5. The battery holder of claim 4, wherein the battery receptacle further comprises at least one mounting slot defined in the base wall in which the warped portion is received.

6. The battery holder of claim 5, wherein the number of resilient members is two and the number of mounting slots is two in which the resilient members are respectively received.

7. The battery holder of claim 1, wherein the at least one resilient member is an elastic strip.

8. A battery holder for holding a battery inside an electronic device, comprising:
a battery receptacle including a base wall and a side wall;
a locking member extending from the sidewall and swinging relative to one end thereof to move out from the battery receptacle; and
at least one resilient member integrally formed with the electronic device, elastically extending beyond the base wall into the battery receptacle.

9. The battery holder of claim 8, wherein the battery receptacle further comprises another sidewall extending substantially perpendicularly from the base wall, in which a locking portion is formed and the battery defines a first locking slot engaged by the locking portion.

10. The battery holder of claim 9, wherein the locking member comprises a main body, from which a resisting portion protrudes from the main body, the resisting portion extends into the battery receptacle and the battery defining a second locking slot engaged by the resisting portion.

11. The battery holder of claim 8, wherein the at least one resilient member comprises a fixing portion and a warped portion protruding from one end thereof; the fixing portion received in the body; the warped portion extends from the base wall into the battery receptacle.

12. The battery holder of claim 11, wherein the battery receptacle further comprises at least one mounting slot defined in the base wall in which the warped portion is received.

13. The battery holder of claim 12, wherein the number of resilient members is two and the number of mounting slots is two in which the resilient members are respectively received.

14. The battery holder of claim 8, wherein the at least one resilient member is an elastic trip.

15. The battery holder of claim 8, further comprising a receiving chamber communicating with the battery receptacle through the sidewall, and the receiving chamber is capable of wholly receiving the locking member.

16. An electronic device, comprising:
a battery defining a locking slot; and
a body including:
a battery receptacle receiving the battery, the battery receptacle including a base wall and a sidewall;
a receiving chamber communicating with the battery receptacle through the sidewall;
a locking member extending from the sidewall and swinging relative to one end thereof to latch in or detach from the locking slot of the battery; and
at least one resilient member elastically protruding from the base wall to resist the battery.

17. The battery holder of claim 16, wherein the locking member comprises a main body and a resisting portion in the battery receptacle, the main body is connected to the sidewall, and the resisting portion protrudes from the main body.

* * * * *